R. R. SNOWDEN.
DRY SEPARATOR.
APPLICATION FILED SEPT. 21, 1908.
935,421.
Patented Sept. 28, 1909.
2 SHEETS—SHEET 1.
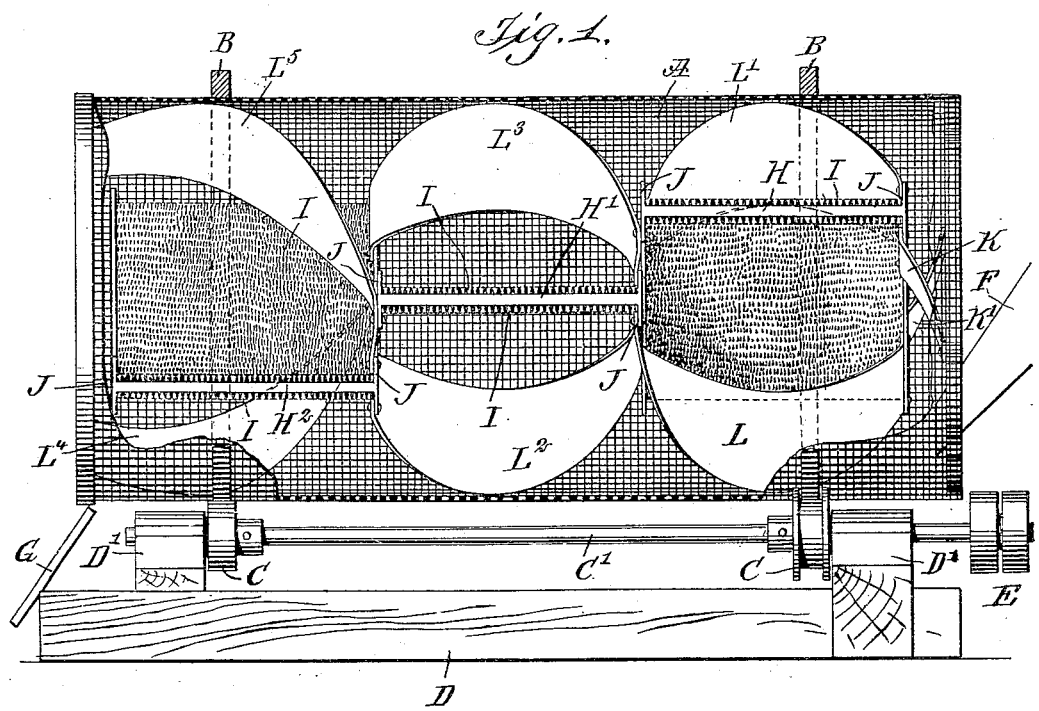
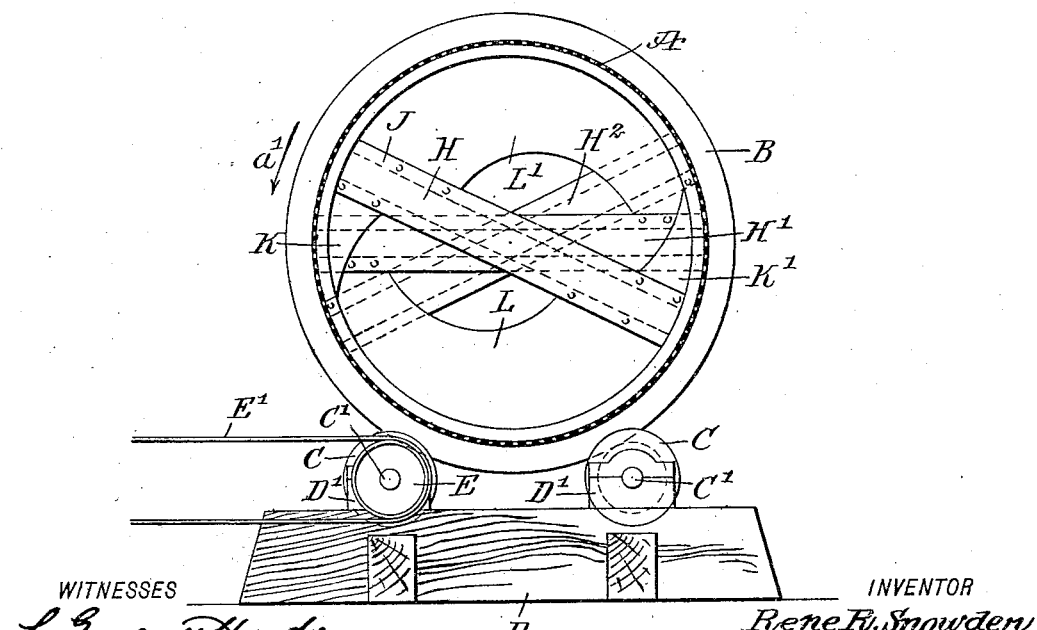
WITNESSES
INVENTOR
Rene R. Snowden
BY
ATTORNEYS R. R. SNOWDEN.
DRY SEPARATOR.
APPLICATION FILED SEPT. 21, 1908.
935,421.
Patented Sept. 28, 1909.
2 SHEETS—SHEET 2.
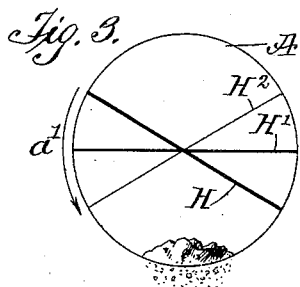
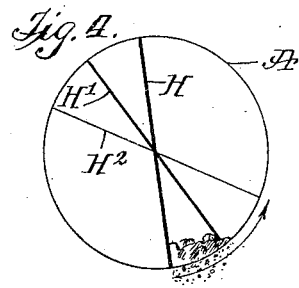
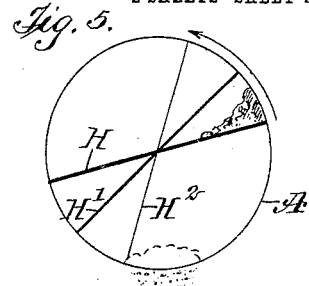
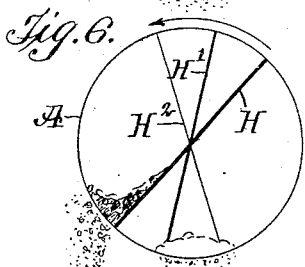
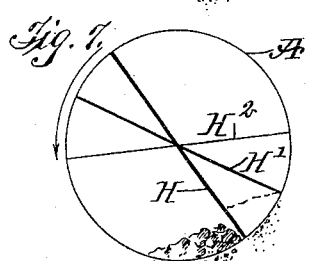
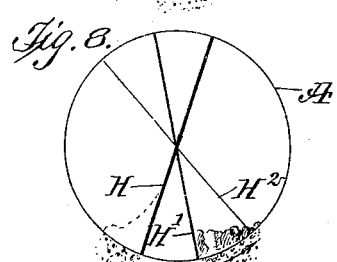
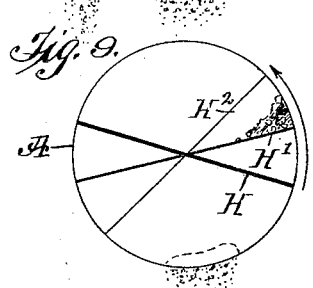
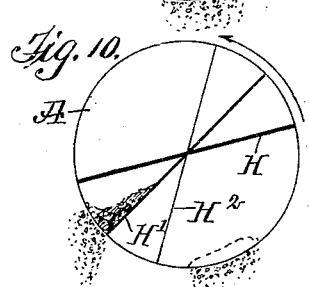
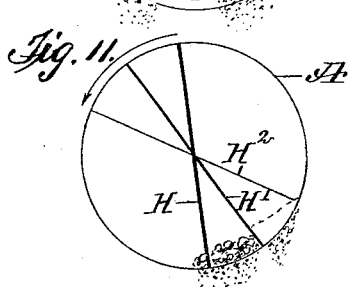
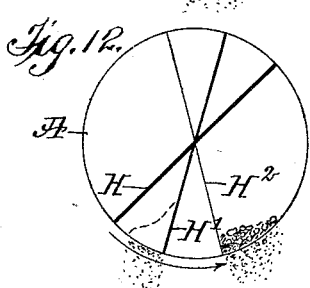
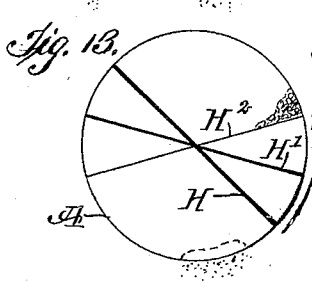
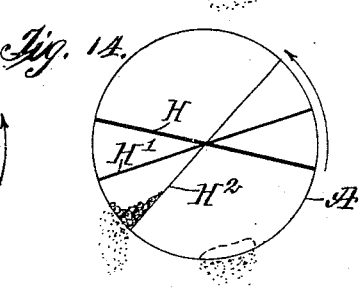
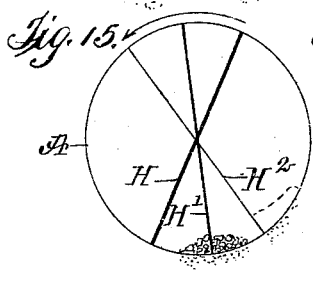
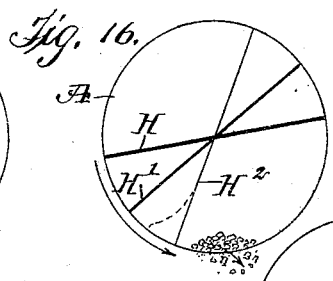
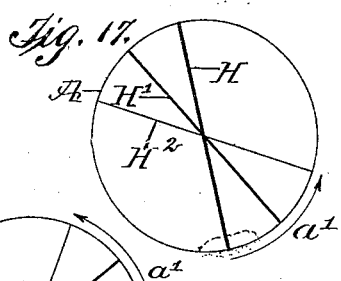
WITNESSES
INVENTOR
Rene R. Snowden
BY
ATTORNEYS

UNITED STATES PATENT OFFICE.

RENE RAVENEL SNOWDEN, OF HOUSTON, TEXAS.

DRY SEPARATOR.

935,421.  Specification of Letters Patent.  Patented Sept. 28, 1909.

Application filed September 21, 1908.  Serial No. 453,904.

*To all whom it may concern:*

Be it known that I, RENE R. SNOWDEN, a citizen of the United States, and a resident of Houston, in the county of Harris and State of Texas, have invented a new and Improved Dry Separator, of which the following is a full, clear, and exact description.

The invention relates to mills, and its object is to provide a new and improved separator, more especially designed for treating crushed phosphate rock and other materials in such a manner that the material in a revoluble screen is subjected to alternate brushing and jarring actions, to thoroughly separate the valuable material from the extraneous matter.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement, parts of the screen being broken out; Fig. 2 is an end elevation of the same; and Figs. 3 to 18 are diagrammatic views showing the revolving screen in the different positions.

A cylindrical screen A, open at the ends is provided on the outside of its rim with rings B, resting on the peripheries of sets of wheels C, having their shafts C' journaled in suitable bearings D' arranged on a suitable base or framework D. One of the shafts C' is provided with fast and loose pulleys E connected by a belt with other machinery for imparting a rotary motion to the corresponding shaft C', for rotating the screen A in the direction of the arrow $a'$, as shown in Figs. 2 to 18.

Into the feed end of the revolving screen A extends a chute F, for conducting the material to be treated into this end of the screen A, and the valuable material passing out of the other end of the screen A drops onto a chute G for conducting the valuable material to a suitable place of discharge.

Within the screen A are arranged partitions H, H', H² extending diametrically from one side of the screen rim to the other side thereof, and the said partitions are set at angles one to the other, as will be readily understood by reference to the drawings.

Each of the partitions H, H', H² is provided on both faces and throughout its length and width with projections I, preferably in the form of bristles, and the sides of each partition H, H', H² are provided with flanges J extending beyond the outer ends of the projections I held on the opposite faces of the corresponding partition. The first partition H is located a distance from the feed end of the screen A, and in this feed end are arranged two feed boards K, K' extending spirally on the rim of the screen A and leading to the flange J at the outer side of the partition H, so that when the material is dropped by the chute F into the feed end of the screen A and the latter is revolved, then the feed boards K and K' direct the material alternately onto the foot or bottom ends of the partition H at the opposite faces thereof. As the screen A rotates further, the corresponding foot end of the partition H takes up the material and carries the same upward, as shown in Figs. 4 and 5, and when the partition H reaches the proper inclination then the material slides down the top face of the partition H to the foot end of the partition. Now the material in traveling down this partition H passes over the projections I on the top face of the partition, and consequently the material is agitated, to separate the valuable particles from the extraneous matter, which latter on reaching the rim of the screen A drops through the meshes thereof (see Fig. 6), while the valuable material is retained within the screen at the bottom thereof. As the screen keeps on rotating, the next batch of material delivered by the chute F into the feed end of the screen A is taken up by the other face of the partition H and elevated, to then finally drop down this face of the partition, the same as above described with reference to the other face of the partition. Now in order to conduct the material from the partition H to the next following partition H', feed boards L and L' are provided, extending spirally along the rim of the screen A from the outer flange J of the partition H to the right hand flange J of the next following partition H'. Thus material delivered by the partition H to the bottom of the screen A is caused to travel along the spiral feed board L or L', to finally pass in front of the foot or bottom end of the corresponding face of the partition H' (see Fig. 8), to be lifted up by the partition H' (see Fig. 9) and to finally roll down this face and over the projections I thereof (see Fig. 10), the same as above described in reference to the partition H. Thus a further separation of the valuable and extraneous matter is had by the action of the second partition H', and a further separation is obtained by conducting the material retained in the screen A from the partition H' to the partition H² by the use of feed boards L², L³, similar to the feed boards L and L', above described. The material is subjected to separation by the partition H² (see Figs. 12, 13 and 14), the same as above described in reference to the partitions H and H', and the material is finally passed out of the discharge end of the screen A (see Figs. 16, 17 and 18) by the use of feed boards L⁴, L⁵, similar to the feed boards L, L' and L², L³. The feed boards L⁴, L⁵ extend from the right hand flange J of the partition H² to the left hand end of the screen A.

By having the flanges J, the material does not drop off sidewise from the partitions H, H', H², but rolls down the face which is uppermost at the time, as above described, the material in thus rolling down the partition being brushed by the projections I, so as to insure a loosening of the sand or other extraneous matter from the phosphate or like material under treatment, the sand being discharged through the meshes of the rim of the screen A, while the material is transferred lengthwise along the bottom of the screen A by the action of the feed boards L, L', L², L³, L⁴, L⁵.

The dry separator shown and described is very simple in construction, not liable easily to get out of order, and is arranged to allow treating a large quantity of material in a comparatively short time.

Having thus described my invention, I claim as new and desire to secure by Letters Patent:

1. A dry separator, comprising a revoluble screen, solid partitions extending diametrically within the screen and set at angles longitudinally of the screen and end to end one to the other, and feed boards arranged spirally on the inside of the rim of the said screen to direct the material to the then lower end of a corresponding partition.

2. A dry separator, comprising a revoluble screen, solid partitions extending diametrically within the screen and set at angles longitudinally of the screen and end to end one to the other, each partition having projections on its surface, and feed boards arranged spirally on the inside of the rim of the said screen adjacent to each partition to direct the material to the then lower end of a succeeding partition.

3. A dry separator, comprising a revoluble screen, solid partitions extending diametrically within the screen and set at angles longitudinally of the screen and end to end one to the other, each partition having flanges at both sides and projecting beyond both faces of the partition, and feed boards arranged spirally on the inside of the rim of the said screen to direct the material to the then lower end of a corresponding partition.

4. A dry separator, comprising a revoluble screen, solid partitions extending diametrically within the screen and set at angles longitudinally of the screen and end to end one to the other, each partition having projections on each surface and flanges at each side, each flange projecting beyond both faces of the partition, and feed boards arranged spirally on the inside of the rim of the said screen to direct the material to the then lower end of a corresponding partition and to the succeeding partition.

5. A dry separator, comprising a revoluble screen, a diametrically extending partition within the said screen and provided at each face with bristles, spiral feed boards on the inner surface of the rim of the screen to direct the material forward in the screen to be picked up by the partition and carried upward to finally roll down the partition back to the screen rim.

In testimony whereof I have signed my name to this specification in the presence of two subscribing witnesses.

RENE RAVENEL SNOWDEN.

Witnesses:
F. M. CABINESS,
C. H. COLEMAN.